No. 836,098. PATENTED NOV. 20, 1906.
L. E. DANIELS.
COOKING UTENSIL.
APPLICATION FILED NOV. 24, 1905.

Witnesses
T. L. Mochabee
James F. Crown

Inventor
L. E. Daniels
By Geo. S. Vashon
Attorney

UNITED STATES PATENT OFFICE.

LAURA E. DANIELS, OF FORT WORTH, TEXAS.

COOKING UTENSIL.

No. 836,098.  Specification of Letters Patent.  Patented Nov. 20, 1906.

Application filed November 24, 1905. Serial No. 288,969.

*To all whom it may concern:*

Be it known that I, LAURA E. DANIELS, a citizen of the United States, residing at Fort Worth, in the county of Tarrant and State of Texas, have invented new and useful Improvements in Cooking Utensils, of which the following is a specification.

This invention relates to improvements in cooking utensils, and particularly that class known as "steam-cookers;" and the primary object of the same is to so construct an apparatus of this class that different kinds of food may be cooked or steamed in one general boiler and be kept separate from each other, so that each shall retain its own flavor only.

A further object is to provide an expansive cooker adapted to contain a plurality of removable cooking vessels having novel steam-vent means.

A still further object of the invention is to provide a cooking utensil which may be readily applied over a burner of a gas or analogous stove.

With these and other objects and advantages in view the invention consists in the construction and arrangement of the several parts, to be more fully hereinafter set forth.

Figure 1:
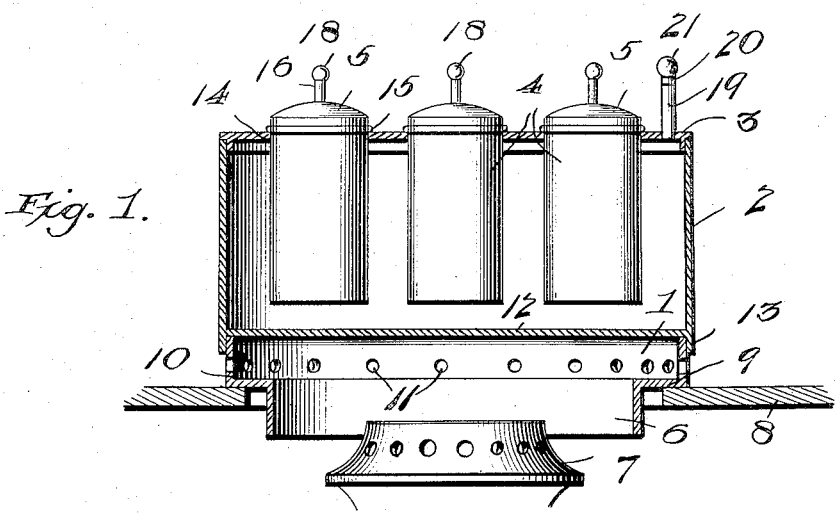
Figure 2:
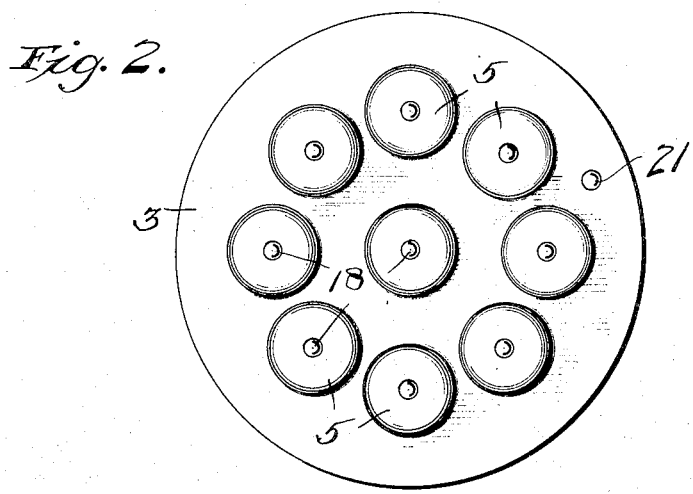
Figure 3:
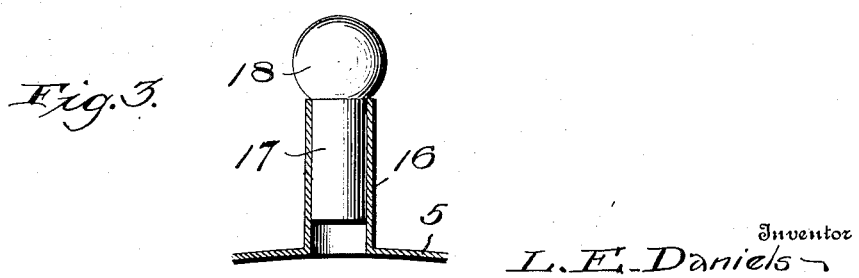

In the drawings, Figure 1 is a sectional view of the improved cooking utensil or apparatus shown applied to a portion of a gas-stove. Fig. 2 is a top plan view of the utensil or apparatus. Fig. 3 is an enlarged detail sectional view of a portion of one of the auxiliary receptacles, showing the construction of the steam-vent therefor.

Similar numerals of reference are employed to indicate corresponding parts in the several views.

The utensil comprises a base-cap 1, a main body or boiler 2, having a removable lid or cover 3, and a plurality of food-receiving receptacles 4, each removably disposed in the said lid or cover and provided with removable caps or covers 5. The base-cap 1 has a depending reduced collar 6 to fit over the burner 7 of a gas-stove 8, the portion of the said cap adjacent to the upper extremity of the collar 6 forming a ledge 9, which bears on the upper surface of the plate of the stove. From the ledge 9 a circumferential flange 10 projects upwardly and is provided with a plurality of openings 11 to admit air to the burner 7 for obvious reasons. The main body or boiler 2 removably fits over the upwardly-projecting flange 10 of the base-cap 1, the bottom 12 of said body or boiler being imperforate and provided with a depending flange 13 to snugly embrace the upper portion of the flange 10, as clearly shown by Fig. 1. The body or boiler 2 may be of any suitable dimensions, and it will be understood that the dimensions of the base-cap 1 and the said body or boiler will be increased or decreased proportionately.

The removable lid or cover 3 of the main body or boiler 2 is formed with a plurality of apertures 14 for the introduction therein of the receptacles 4, the latter preferably having upper circumferential rest flanges or guards 15, which contact with the upper surface of the said lid or cover 3 and limit the projection of the receptacles 4 through the latter. Each receptacle 4 has a closed bottom or is constructed to obviate or overcome any tendency of leakage and will be preferably circular in shape in cross-section. The cap or lid 5 of each receptacle 4, as clearly shown by Fig. 3, has a tubular stem 16 rising from the center thereof and opening at its bottom therethrough, said stem serving in one capacity as a handle or grip for removing and applying the cap or lid 5. This tubular stem also serves as a steam-vent and that of each receptacle has a cylindrical plug or shank 17 slidably mounted therein and provided with an upper spherical or other analogous head 18.

In preparing the cooking utensil or apparatus for use the base-cap 1 is first applied over the burner 7, as shown, and the body or boiler 2 fitted on the said cap with a quantity of water therein. The articles of food to be cooked are disposed in the several receptacles 4 and the latter placed in the lid or cover 3. This lid or cover is then fitted over the body or boiler 2, and as the heat from the burner 7 correspondingly raises the temperature of the water in the body or boiler 2 the contents of the receptacles 4 are regularly cooked without liability of scorching or burning, with material advantages in the cooking operation or preparation of the articles of food from a palatable standpoint. The articles of food being confined in separate receptacles cannot become contaminated one by the other or the flavor of any article of food in one receptacle become tainted or resemble that of an article of food in an adjacent receptacle. The steam that is generated in the body or boiler 2 escapes through a tubular vent 19, opening through the lid or cover 3 and having a plug or shank 20 slidably disposed therein and provided with a spherical head 21 at its upper end and similar in all respects to the vent structure illustrated by Fig. 3. The steam which generates in the several receptacles 4, as well as in the body or boiler 2, will cause the plug or shank 17 to rise in each instance, when the force of the steam overcomes the weight of the plug and spherical head and unsets the head, thereby permitting the steam to escape through the tubular stem of each receptacle or of the lid or cover 3. It will be understood that if found necessary sufficient water or other liquid may be introduced in the receptacles 4 with the articles of food.

The steam-vents on the lid or cover 3 and the caps or covers for the receptacles 4 have an automatic operation, and the shanks or plugs and heads coöperating with the tubular stems will be of sufficient weight to retain the steam within the several receptacles such length of time as to derive benefit in the cooking operation, as well as the preservation of the flavors of the articles of food; but these movable parts will quickly respond to the steam-pressure and permit the escape of the steam before it becomes strong enough to throw off or accidentally release the caps or covers 5 or loosen the lid or cover 3. The tendency to accidentally release or upthrow the lid or cover 3 is reduced to a minimum, however, in view of the number of receptacles carried thereby and the consequent weight imposed thereon.

When it is desired to use the burner 7 for other purposes, the parts of the cooking utensil or apparatus may be readily removed, and, furthermore, all the parts of the utensil can be easily separated for cleaning purposes. As many receptacles may be used as desired, the utensil not being confined to any particular number. Any suitable metal may be used in the construction of the parts of the utensil, and one of the greatest advantages that accrues from the use of the utensil is that one burner of a gas or other analogous stove will effect as much work in the operation of cooking as a number of burners heretofore used for a similar purpose, and thereby materially economize in the use of fuel. Furthermore, it will be understood that at any time desired during the cooking operation the cap or cover 5 of any receptacle may be removed and reapplied without disturbing the remaining receptacles or in the least checking the operation of cooking the articles of food in such remaining receptacles. To avoid the escape of steam through the apertures 14 in which the receptacles 4 are fitted, the said receptacles are caused to snugly engage the said apertures.

Other advantages will be apparent to those using the device, and it is proposed to modify the details of construction as may be found desirable within the scope of the invention.

What I claim is—

The combination with a burner of a gas or analogous stove, of a hollow base-cap comprising a ledge, a depending collar and an upwardly-projecting perforate flange, a boiler-body having a closed bottom with a flange depending below the same to fit over the said upwardly-projecting circumferential flange of the cap, a lid or cover removably applied to the body and having a plurality of cooking-receptacles centrally and concentrically arranged therein and removable therefrom and held in pendent relation to the body, the upper extremities of the receptacles being accessible from the exterior of the boiler, removable lids or covers applied to the receptacles and vent devices provided with weighted closures coöperating with both the lids or covers of the boiler of the receptacles.

In testimony whereof I affix my signature in presence of two witnesses.

LAURA E. DANIELS.

Witnesses:
H. C. CANTRELL,
J. B. DENTON.